US006652785B1

(12) United States Patent
Harris

(10) Patent No.: US 6,652,785 B1
(45) Date of Patent: Nov. 25, 2003

(54) OPERATORLESS EXTRUSION SYSTEM

(75) Inventor: Holton E. Harris, Westport, CT (US)

(73) Assignee: Harrel, Incorporated, East Norwalk, CT (US)

( * ) Notice: Subject to any disclaimer, the term of this patent is extended or adjusted under 35 U.S.C. 154(b) by 391 days.

(21) Appl. No.: 09/824,859

(22) Filed: Apr. 4, 2001

(51) Int. Cl.[7] ............................ B29C 47/92; B29C 47/96
(52) U.S. Cl. .................. 264/40.7; 264/176.1; 425/136; 425/145; 425/154; 425/155; 425/166; 425/377
(58) Field of Search ............................ 264/176.1, 40.1, 264/40.7; 425/136, 145, 154, 155, 166, 377, 461

(56) References Cited

U.S. PATENT DOCUMENTS

| 2,162,482 A | * | 6/1939 | Hanna ........................ 425/145 |
| 2,698,964 A | * | 1/1955 | Tornberg ..................... 425/136 |
| 3,605,216 A | * | 9/1971 | Bradshaw .................... 425/145 |
| 4,171,193 A | * | 10/1979 | Rahlfs ........................ 425/145 |
| 4,209,476 A |   | 6/1980 | Harris ........................ 425/145 |
| 4,613,471 A |   | 9/1986 | Harris ........................ 425/145 |
| 5,695,789 A |   | 12/1997 | Harris ........................ 425/145 |
| 5,725,814 A |   | 3/1998 | Harris ........................ 264/40.3 |

* cited by examiner

Primary Examiner—James P. Mackey
Assistant Examiner—Joseph Leyson
(74) Attorney, Agent, or Firm—Gallagher & Kennedy, P.A.; Thomas D. MacBlain

(57) ABSTRACT

An extrusion system controller monitors the movement of an extrudate using a motion detector. Upon detection that the extrudate is no longer moving along its path of movement at the appropriate speed, the controller causes power interruption to the extrusion system by a controlled power switching device. A dimensional anomaly detected by a gauge can cause the controller to effect power interruption as well, when the anomaly lies outside a range of correctable dimensions or when the anomaly does not respond to corrective action by the controller. In the event that a cutter is used on the extrusion line, a detector that may be a photodetector senses that the extrudate is being severed regularly. In the absence of regular severance of the extrudate, the controller effects a power interruption. By use of these techniques, the extrusion line can run entirely unattended.

23 Claims, 2 Drawing Sheets

OPERATORLESS EXTRUSION SYSTEM

FIELD OF THE INVENTION

This invention relates to automatically operated extrusion systems, their methods of operation and their control. More particularly, this invention relates to extrusion methods, systems and controls that safely operate without a human operator in attendance, shutting down automatically in the event of an irremediable malfunction.

BACKGROUND OF THE INVENTION

Extrusion systems are known that correct for dimensional variances in the extrudate. For example, my U.S. Pat. No. 4,209,476, issued Jun. 24, 1980, incorporated herein by reference, describes, among others, a tube extrusion system in which a gear pump accurately meters the throughput of melt, a speed sensor measures the speed of movement of a tubular extrudate and a gauge measures the outside diameter of the tubular extrudate. Inside diameter is calculated. Departure from the desired inside or outside diameter causes a controller to vary a dimension-affecting parameter such as the gear pump speed, the puller speed, the air pressure inside the tube or the vacuum outside the tube. Sold by Harrel, Incorporated, the assignee of the present invention, tinder the trademark TUBETROL®, such a system works well for its intended purpose. If left unattended, it does not, however, shut down the line when there occurs either a severe malfunction of the system or a dimensional anomaly that cannot be remedied.

It would be desirable to have an extrusion system operable overnight, with no operator in attendance. In that case, just an alarm in the form of a siren or flashing light will not suffice in the event of a malfunction. No one is nearby to respond. Continued operation of the line could be disastrous.

For the purpose of detecting whether an extrusion system is operating correctly, it is not enough just to measure extrudate dimensions at a point along the extrudate's path of movement. An extrudate that has ceased movement (or is not moving at the appropriate speed) may have the desired dimensions. A gauge on a point on its path of movement will detect that an appropriately dimensioned extrudate is present where it should be. The gauge will not detect the lack of appropriate movement. Meanwhile, still hot plastic is emerging from the die upstream of the gauge. A system in this condition, left unattended overnight will present its operator with a large cleanup task, a waste of material and perhaps even equipment damage upon discovery.

Similarly, although controls like the commercially available Harrel TUBETROL® are excellent in their day-to-day control of an extrusion line, if left unattended overnight, and if for some unforeseen reason, out-of-dimension product cannot be brought back into spec, the operator again is faced with an unpleasant surprise on return to the line. An entire shift's worth of unacceptable product may have been manufactured.

A malfunctioning cutter that has ceased cutting extrudate regularly into prescribed lengths is another hazard that can be disastrous to the unattended extrusion line. If the extrudate is not severed or permitted to move away from the line, the likely result, again, can be a shift's worth of damaged product.

BRIEF SUMMARY OF THE INVENTION

In accordance with the present invention, an extrusion system is provided in which all power to the extrusion system is supplied via a switchable device or devices under the control of an extrusion controller coupled to a motion detector. In the event that the extrudate stops moving or does not move at the appropriate speed, the controller cuts off all power to the system. In other words, if the motion detector does not detect appropriate movement, either because the extrudate has stopped moving or because the extrudate is moving at the wrong speed, the extrusion system is shut down entirely.

In addition to the motion detector, the controller of the present system can receive an input from a dimension-measuring gauge. A corrective action undertaken by the controller to vary a dimension affecting parameter of the system should result in the gauge sensing and providing to the controller as an input a corrected dimensional measurement. If the measured dimension does not so-respond, the controller then causes interruption of power to the system by the switchable power device. Alternatively, or in addition to the controller's sensing of a failure to respond to an adjustment of a dimension affecting parameter, the controller can be made to cause power interruption to this system in response to the detection of a dimensional anolomy so severe as to be beyond the control of the controller.

The motion detector coupled to the controller ordinarily includes a roller or rollers engaging the extrudate being formed to confirm that it is moving linearly along its path of movement at the correct speed. A motion detector in the form of a photodetector at the downstream side of an extrudate cutter can serve as the linear movement detecting motion detector, or can be used in addition to the linear movement detecting motion detector. As an extrudate is continually cut into lengths, the severed length typically drops or moves laterally out of the path of linear movement of the extrudate. The photodetector detects either the movement of the severed section out of its field of vision, or the movement of the severed extrudate section past its field of vision, depending upon the positioning of the photodetector. An output from the photodetector is input to the extrusion system controller. Programming of the controller looks for this input and resets a timer. If within a prescribed time no severance is indicated, the controller causes the interruption of electrical power to the system. A controller suitable to run this and other programs described here is the Harrel DIGI-PANEL® Controller available from Harrel, Incorporated, East Norwalk, Conn.

In the case of the extrusion of a tubular extrudate, a TUBETROL® type of control program such as is described in my earlier U.S. Pat. No. 4,209,476 is used. A metering pump in the form of a gear pump delivers extrudate to the die of the extrusion system. This pump very accurately controls the volume of melt delivered to the die. As the extrudate emerges as a tube, its outside diameter is measured and its rate of linear movement is measured. From the speed of the metering pump, the volume of melt being delivered is known and the thickness of the tube wall is calculated. Using this technique, power to the extrusion system can be interrupted in the event that there occurs any one of a failure of the extrudate to move linearly along its path at the appropriate speed, an irremediable outside diameter error, or an irremediable tube wall thickness error.

The above and further features and advantages of the invention will be better understood with reference to the following detailed description of a preferred embodiment taken in consideration with the several views of the appended drawings.

DETAILED DESCRIPTION OF PREFERRED EMBODIMENT

Figure 1:
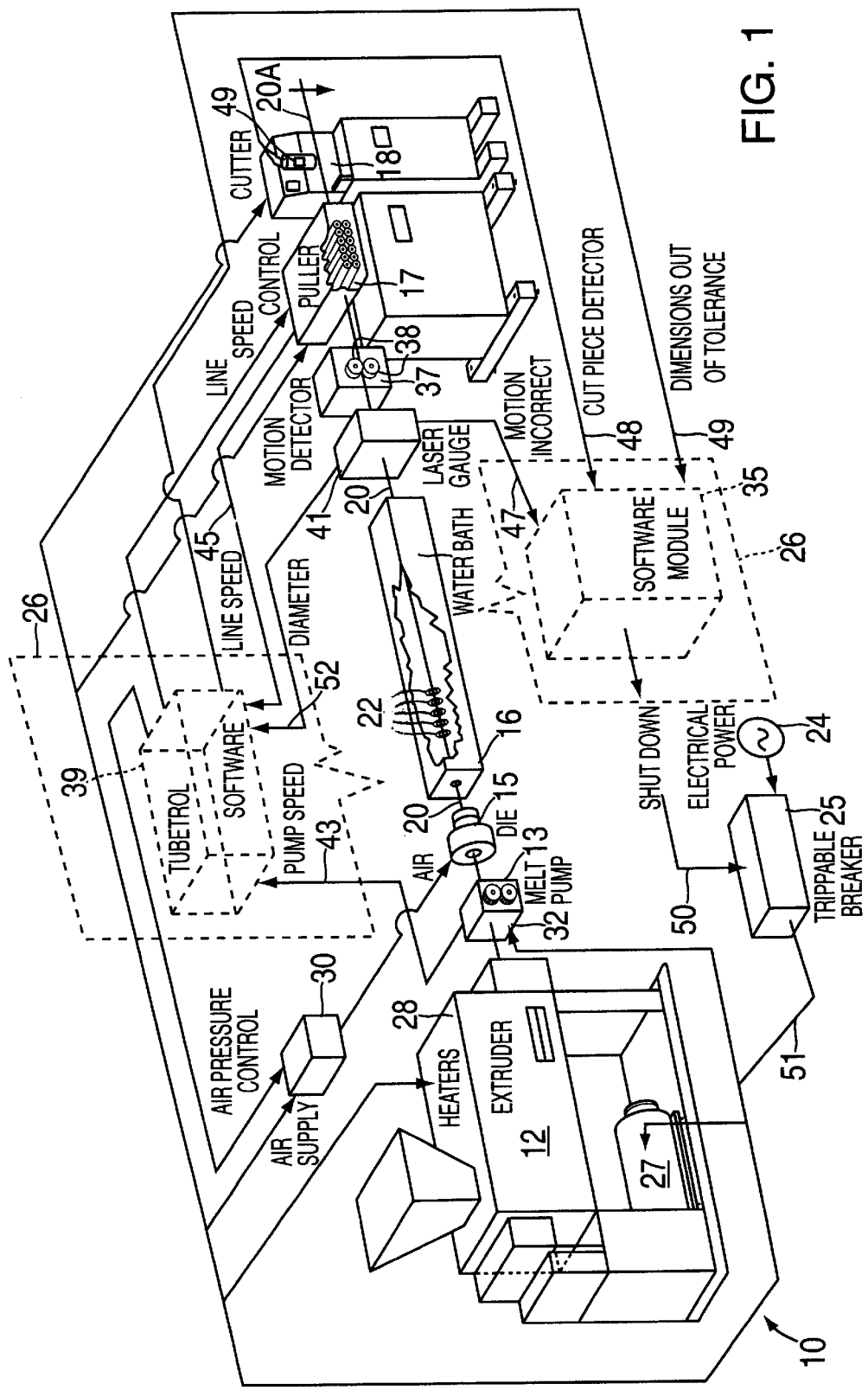
FIG. 1 is a schematic illustration in block diagram form of an extrusion system, controller and power supply device in accordance with the present invention.

In FIG. 1, an extrusion system 10 includes an extruder 12, a gear pump 13, a die 15, a vacuum tank 16, a puller 17, and a cutter 18. A tubular extrudate 20 emerging from the die 15 travels linearly along a path of travel through the vacuum tank 16 where it is water cooled and sized by a series of sizing rings 22 in known fashion. The puller 17 pulls the extrudate 20 through the tank 16 delivering it to the cutter 18 where it is severed into lengths 20a of prescribed length.

Electrical power is delivered to the extrusion system 10 from a power source 24 via a switchable device or breaker 25. One such device is a shunt trip accessory available from Westinghouse Electric Company, Cheswick, Pa. It is a trippable circuit breaker suitable for being controlled from a controller such as the Harrel DIGIPANEL® Controller. In FIG. 1, the controller is represented functionally in two sections shown in broken lines and each designated 26.

The breaker 25 in FIG. 1 is shown controlling all power to the system 10 including the gear pump motor at 32, the extruder screw motor 27, the extruder heaters at 28, an air pressure supply at 30 that maintains the air pressure within the tubular extrudate, the puller 17, and the cutter 18. The trippable breaker 25 is shown in FIG. 1 under the control of a software module 35, which represents a set of program routines in the extruder controller 26. The module is responsive to an indication of an error in the speed of the extrudate delivered by a motion detector 37, which may include one or more rollers 38 engaging the extrudate 20 to sense its linear motion along its path of movement. The module 35 is responsive, as well, to an out of tolerance dimension input from a module 39 that is a controller's set of control programming routines. For example, extrudate outside diameter is sensed by a laser gauge 41, or less preferably, by an ultrasonic gauge. In the case of a tubular extrusion operating under the TUBETROL® control routines of the above referenced '476 patent, tube wall thickness is calculated from pump speed information delivered at 43 from the melt pump 13, and from the line speed information delivered from the puller at 45. In other than tubular extrusion, the monitored dimension or dimensions may be sheet thickness, width or thickness of a rod or other solid extrudate, etc.

Figure 3:
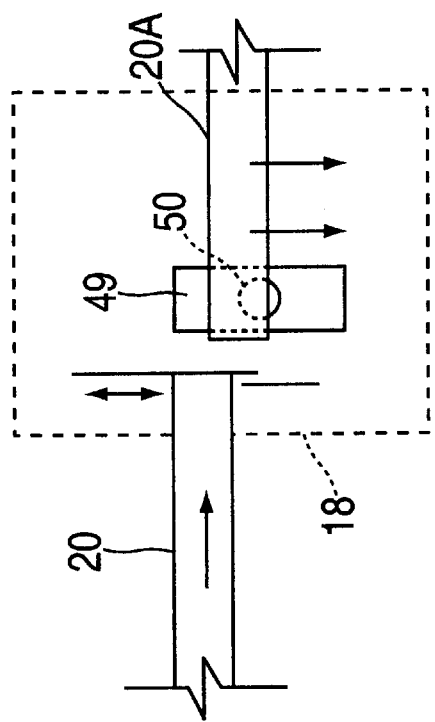
FIG. 3 is a diagrammatic illustration of an alternative location of the photodetector of FIG. 2.
Figure 2:
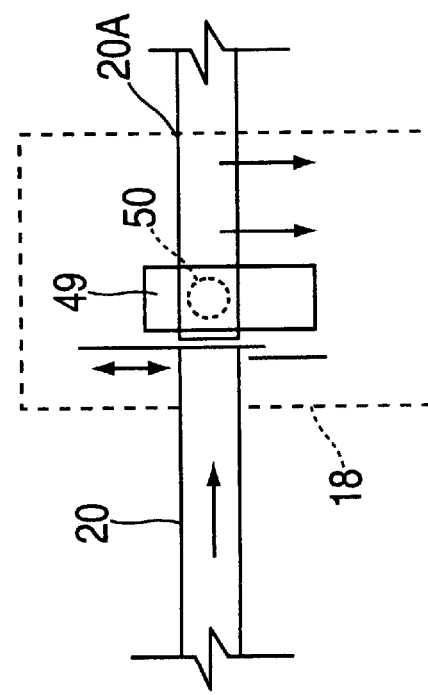
FIG. 2 is a diagrammatic illustration of a photodetector serving as a severance detector at the downstream side of a cutter.

A detector 49 at the cutter 18 detects the regular severance of the extrudate by the cutter. As shown in FIG. 2, severance may be detected by the severed segment of extrudate 20a falling out of view of a photodetector 50 after it has been severed, or alternatively as shown in FIG. 3 by the severed segment of extrudate 20a interrupting the line of sight of the photodetector 50. The cutter and detector 49 are eliminated (or turned off) in applications where the extrudate is continuously wound onto a reel or folded into a store. Since stoppage of the extrudate upstream of the cutter will result in the photodetector no longer seeing segments 20a moving past it, it is possible to use the movement of the segment 20a laterally after severance as the motion detection that signifies to the module 35 of FIG. 1 the presence or absence of motion in the extrudate indicating whether the extrudate has come to a halt.

Similarly, on the occasion of continuously reeled extrudate, a monitoring of the rotation of the reel or of a guide roller or less preferably of the diameter of the reeled extrudate can provide a further indication of proper operation of the system. And in applications where a continuous strand or sheet is folded into a store, a level indication can serve to this end.

The inputs that the controller 26 monitors to determine if the extrusion system 10 should be shut down are shown at 47, 48 and 49 in FIG. 1. The input 47 is taken directly from the motion detector 37, which may be any of a number of commercially available detectors having an electrical output representative of, for example, the speed of the extrudate being monitored. The programming 35 of the controller 26 monitors this input 47. If no motion (or an inappropriate speed) is indicated at the input, then a control output 50 is generated by the controller 26. This trips the breaker (or bank of breakers) 25. Electrical power, previously supplied from the source 24 to the extrusion system power lines 51 is now interrupted.

Using an internal clock, the programming of the module 35 of the controller 26 looks for a severance indicative input at the input 48. If that is received before the internal timer times out, the clock is reset. If not, the software calls for the shutdown output 50 and again power to the lines 50 is interrupted.

The input 49 is taken from the extrusion system control programming module 39. That module compares a dimensional input 52, taken from the gauge 41, with a standard or set point. If the dimension is not within an established acceptable range, this "dimensions out of tolerance" input 49 is sent to the module 35. A timer may be set. If the error signal persists beyond the pre-established time out time of the timer, then again the software module 35 calls for a shutdown output 50 to the breaker 25 and power to the system is interrupted.

Alternatively, or additionally, the extrusion system control software module 39 may compare the measured dimension represented by the input at 52 with a value that represents a measure of that dimension not capable of being remedied. If the dimension exceeds that maximum (or falls below, if the value is a minimum), then the "dimensions out of tolerance" indication is given to the module 35 and then shut down output 50 is generated to interrupt power to the entire system.

Using the TUBETROL® methodology of the previously mentioned U.S. Pat. No. 4,209,476, it can be the calculated tube wall thickness that is used as a basis for determining that the system should be shut down, either because an error has persisted too long or the thickness is beyond a value capable of being remedied.

While preferred specific embodiments of the invention have been described, it will be apparent to those skilled in the art that modifications and alterations can be made without departure from the spirit and scope of the invention as set forth in the appending claims.

What is claimed is:

1. In an extrusion system including an extruder for producing an extrudate, the improvement comprising a motion detector along the path of movement of an extrudate downstream of the extruder and responsive to movement of the extrudate therepast to produce an output indicative of extrudate movement, an extruder controller coupled to the motion detector to receive the output of the motion detector, and a controlled switching device operatively connecting the extrusion system to an electrical power source, the controller being connected in controlling relation to the switching device, and the controller being responsive to an output of the motion detector indicative of a lack of appropriate movement of the extrudate to cause the switching device to interrupt electrical power to the extrusion system.

2. The improvement in an extrusion system according to claim 1, further comprising a dimension measuring gauge downstream of the extruder, the gauge having an output representative of a dimension being measured, said controller being connected with the gauge and operative to control a dimension-affecting extruder operating parameter in response to the output of the gauge.

3. The improvement in an extrusion system according to claim 2, wherein the controller is operative to detect a dimension anomaly unresponsive to corrective action by the controller to cause the switching device to interrupt electrical power to the extruder.

4. The improvement in an extrusion system according to claim 3, wherein the controller includes a timer, the controller being operative to effect interruption of the electrical power to the system responsive to the dimension anomaly persisting for a predetermined time without adequate response to a corrective action.

5. The improvement in an extrusion system according to claim 1, wherein the motion detector comprises at least one roller located to contact the passing extrudate, the motion detector having an output indicative of longitudinal motion of the extrudate in response to rotation of the roller.

6. The improvement in an extrusion system according to claim 1, the system further comprising a cutter operative to continually sever the extrudate at a location downstream of the die, and a severance detector downstream of the cutter to generate a severance detector output indicative of whether the extrudate is continually severed, the controller being coupled to the severance detector to receive the severance detector output and being operative to cause the switching device to interrupt power to the extruder in response to the severance detector detecting failure of the cutter to continually sever the extrudate.

7. The improvement in an extrusion system according to claim 6, wherein the severance detector includes a photo-detector located to sense repeated lateral movement of a severed length of extrudate.

8. The improvement in an extrusion system according to claim 7, wherein the controller includes a timer and is programmed to effect interruption of the electrical power to the system by the switching device upon passage of a predetermined time period without a severance indication from the severance detector.

9. An extruder controller including a motion detector input representative of whether an extrudate output from an extruder is in motion, an extruder electrical power control output effective to open or close a controllable electrical power switching device, and programming including a routine responsive to an input at the motion detector input indicative of an absence of appropriate extrudate motion to effect the production of a power interrupting output signal at the extruder electrical power control output.

10. The extruder controller according to claim 9, further comprising at least one further input, a timer and further programming operative to effect the production of a power interruption signal at the extruder electrical power control output upon failure to detect a desired input at the at least one further input within a predetermined period of time.

11. The extruder controller according to claim 10, wherein the at least one further input is an extrudate dimension input, the further programming being responsive to the dimension input to effect the production of a power interruption signal at the extruder electrical power control output in the absence of the desired input that is representative of a dimensional effect within the predetermined period of time.

12. The extruder controller according to claim 11, further comprising at least one further extruder control output, the programming including control programming to effect control of an extrudate dimension in response to the extrudate dimension input, the further programming being operative to effect the production of a power interruption signal at the extruder electrical power control output in the absence of a dimension input indicative of the control of an extrudate dimension by the control programming within the predetermined period of time.

13. The extruder controller according to claim 9, wherein the motion detector input indicative of an absence of appropriate extrudate motion to which the routine is responsive to effect the production of a power interrupting output signal is a motion detector input indicative of failure of a repetitive lateral movement of extrudate severed by a cutter.

14. The extruder controller according to claim 10, wherein the at least one further input includes a severance-indicative input that repeatedly indicates severance of an extrudate, the further programming being operative to effect the production of the power interruption signal at the extruder electrical power control output upon failure to receive a severance-indicative input within the predetermined period of time.

15. In an extrusion system including an extruder for producing an extrudate, the improvement comprising:
(a) means for detecting extrudate motion downstream of the extruder and for producing an output indicative of whether appropriate extrudate motion has been detected,
(b) extruder control means coupled to the means for detecting for producing an extruder system power controlling output in response to an output indicative of a lack of appropriate extrudate movement, and
(c) power interruption means coupled to the control means and responsive to the extruder system power controlling output to interrupt electrical power to the extrusion system upon receipt of a power control signal output from the control means.

16. The extrusion system according to claim 15, wherein the means for detecting extrudate motion comprises means for detecting linear extrudate motion lengthwise of the extrudate.

17. The extrusion system according to claim 15, wherein the means for detecting extrudate motion comprises means for detecting motion of the extrudate away from a lengthwise path of movement of the extrudate caused by severance of the extrudate.

18. The extrusion system according to claim 15, wherein the extruder control means comprises means for receiving an input indicative of an extrudate dimension, the extrusion control means being programmable and having corrective programming for controlling the extrudate dimension and programming responsive to the input indicative of an extrudate dimension for effecting a power interruption upon failure of the input indicative of an extrudate dimension to indicate correction of the dimension in response to the corrective programming.

19. The extrusion system according to claim 15, wherein the extruder control means comprises means for receiving an input indicative of an extrudate dimension, the extrusion control means being programmable and having programming responsive to the input indicative of an extrudate dimension indicating a dimension being outside a predetermined limit for effecting a power interruption.

20. A method of controlling an extrusion system including:
  (a) providing a motion detector in proximity to a path of movement of an extrudate being formed by an extruder;
  (b) sensing with the motion detector the presence or absence of appropriate extrudate motion on the path of movement;
  (c) connecting a power switching device in power supplying relation to the extrusion system;
  (d) providing a controller in controlling relation to the switching device;
  (e) supplying to the controller an output from the motion detector indicative of whether the extrudate is moving; and
  (f) controlling the switching device with the controller to automatically interrupt electrical power to the extrusion system when the controller receives an output from the motion detector indicative that the absence of appropriate extrudate motion on the path of movement.

21. The method of controlling an extrusion system according to claim 20, wherein sensing with the motion detector comprises sensing the presence or absence of appropriate linear movement of the extrudate along the path of movement.

22. The method of controlling an extruding system according to claim 20, wherein sensing with the motion detector comprises sensing the presence or absence of appropriate movement of sections of extrudate caused by continually automatically severing of an extrudate.

23. The method of controlling an extrusion system according to claim 20 further comprising:
  (a) providing a gauge in association with the path of movement for measuring a dimension of an extrudate moving along the path of movement;
  (b) providing an output from the gauge to the controller indicative of the measured dimension;
  (c) controlling a dimension affecting extruder-operating parameter to maintain or correct the measured dimension; and
  (j) the step of controlling the switching device with the controller further includes controlling the switching device to automatically interrupt electrical power to the extrusion system in the event of a failure of the measured dimension to respond to a corrective change in the dimension affecting parameter.

\* \* \* \* \*